United States Patent [19]

Guidry

[11] Patent Number: 4,982,974
[45] Date of Patent: Jan. 8, 1991

[54] ADJUSTABLE HIGH VEHICLE BOARDING STEP

[75] Inventor: Warren L. Guidry, Rayne, La.

[73] Assignee: Interco Tire Corporation, Rayne, La.

[21] Appl. No.: 305,627

[22] Filed: Feb. 3, 1989

[51] Int. Cl.$^5$ .............................................. B60R 3/02
[52] U.S. Cl. ................................... 280/164.2; 182/91; 280/166
[58] Field of Search ..................... 780/166, 164.2, 164, 780/760; 180/69.21; 182/89, 88, 90, 91, 92, 127

[56] References Cited

U.S. PATENT DOCUMENTS

| 796,895 | 8/1905 | Childers | 280/164.2 |
|---|---|---|---|
| 2,118,557 | 5/1938 | Hamilton | 280/166 |
| 2,125,085 | 7/1938 | Pool | 280/166 |
| 3,266,594 | 8/1966 | Antosh et al. | 280/166 |
| 3,853,369 | 12/1974 | Holden | 182/91 |
| 3,889,997 | 6/1975 | Schoneck | 280/166 |
| 3,986,724 | 10/1976 | Rivinius | 280/166 |
| 4,180,143 | 12/1979 | Cugston | 280/166 |
| 4,408,680 | 10/1983 | Ross | 182/127 |
| 4,566,552 | 1/1986 | Hoffman et al. | 180/69.21 |

FOREIGN PATENT DOCUMENTS 845429  8/1939  France ............................ 280/166

Primary Examiner—David M. Mitchell
Attorney, Agent, or Firm—Kerkam, Stowell, Kondracki & Clarke

[57] ABSTRACT

A fully-adjustable boarding step for vehicles, and especially for off-road vehicles, wherein the cab or operator's position is high enough from the ground such that it is not easily accessible for boarding because of the clearance required between the ground and the frame of the vehicle. The device is a retractable, fully adjustable step adapted to fit a variety of the frames of presently used vehicles.

26 Claims, 4 Drawing Sheets

FIG. I

ADJUSTABLE HIGH VEHICLE BOARDING STEP

BACKGROUND OF THE INVENTION

The present invention relates to a boarding step for use in high-clearance vehicles that are not easily mounted and more particularly to a retractable, fully adjustable step which provides safety and ease of operation to the operator of such vehicles.

BACKGROUND ART

High-clearance vehicles such as trucks, heavy construction equipment such as road graders, off-road vehicles and the like require the operator to mount the vehicle by pulling himself up to reach the cab or operator's station. This practice has proven to be unsafe when an operator does not have a solid foothold, causing slips and falls. Consequently, various forms of mounting and dismounting steps have been proposed for such vehicles, including hydraulic, motor driven and door operated devices which are positioned after the operator alights onto the step or when a door is opened. Many of these proposed devices are adapted to and used with specific or customized mounting schemes, such as truck frames, and are permanently mounted onto the frames by bolts, welding or other mounting means which may require machining or alteration of the frame. Some of these devices also require connection to and integration with other operating systems of the vehicle, such as electrical or hydraulic systems. Most of these systems are not adjustable and can only be used with the specific type of vehicle for which they were customized.

SUMMARY OF THE INVENTION

Accordingly, it is an object of the present invention to provide for an adjustable vehicle step capable of use with various types of vehicle frames.

Another object of the present invention is to provide an adjustable boarding step which can fit a frame of a vehicle without necessitating machining or altering the frame of the vehicle.

Another object of the invention is to provide an adjustable boarding step which is independent of other operational systems on the vehicle.

Another object of the invention is to provide a boarding step that can be attached directly on to the frame of a vehicle.

Still another object of the present invention is to provide a boarding step having means for adjusting both the linear and the angular dimensions of the step so that the step during use is at all times substantially parallel to the ground.

Another important and distinct advantage of the present invention is to provide a boarding step having a biasing means for maintaining the step at a level, approximating the level of the frame of the vehicle, and further including a shock absorbing means, for moderating the force and momentum of the biasing means, thereby providing a measure of safety in the event that an operator accidentally and unintentionally looses his or her footing on the step.

In accordance with these and other objects of the invention, there is provided a boarding step for use on high-clearance vehicles that are otherwise mounted with difficulty. The step of the present invention includes a bracket means for clamping onto the supporting structure of the vehicle, such as a vehicle frame. At least two support members are connected at one end to the bracket means and at the other end to a step assembly, including a platform or step. A biasing means, such as, for example, a spring, serves to maintain the boarding step in a desired predetermined position when the step is not in use or when the vehicle is in motion. However, the step is fully adjustable in longitudinal and to a certain extent angular directions, and is adjustable to enable it to be clamped over a variety of supporting structures, such as off-road vehicle frames.

DETAILED DESCRIPTION OF THE INVENTION

Figure 1:
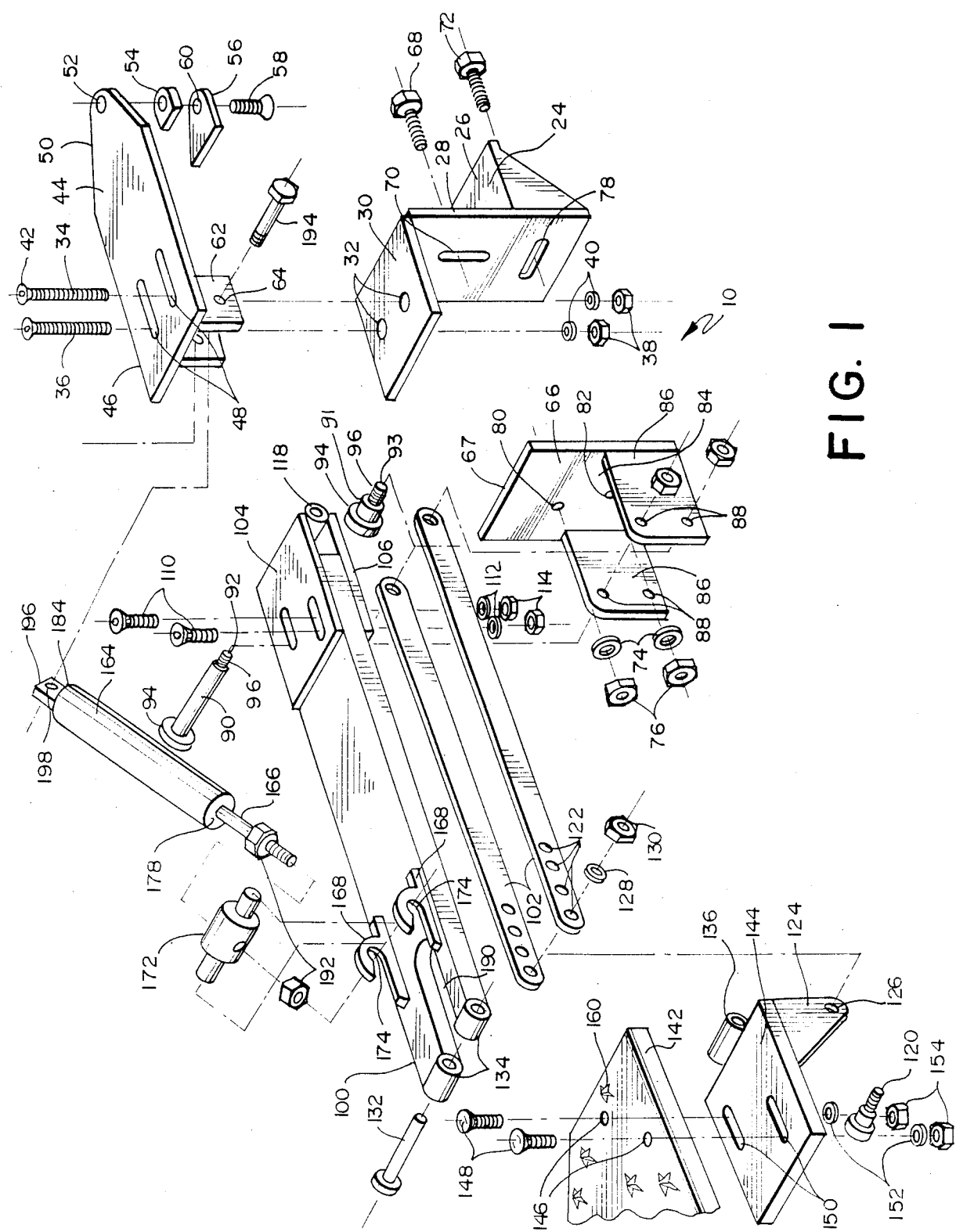
FIG. 1 illustrates three dimensionally the interrelationship of the individual parts or elements of the invention in an exploded view form.
Figure 2:
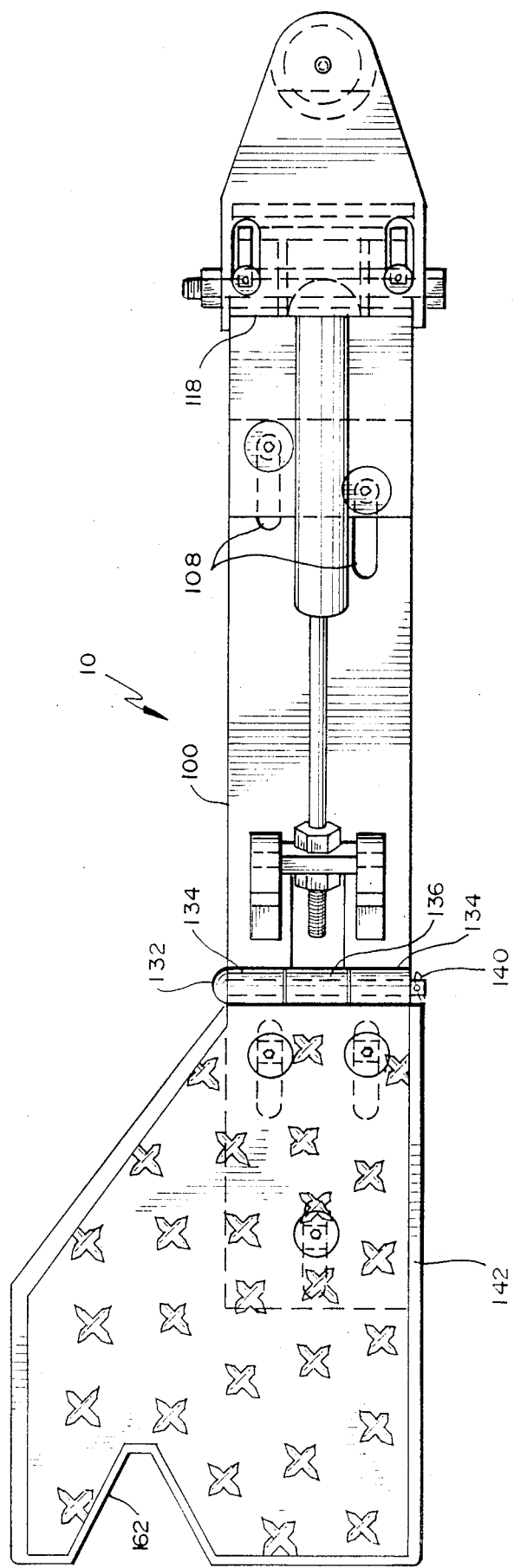
FIG. 2 illustrates a plan view of the step assembly according to the present invention, and shows the step and its supporting member only.
Figure 3:
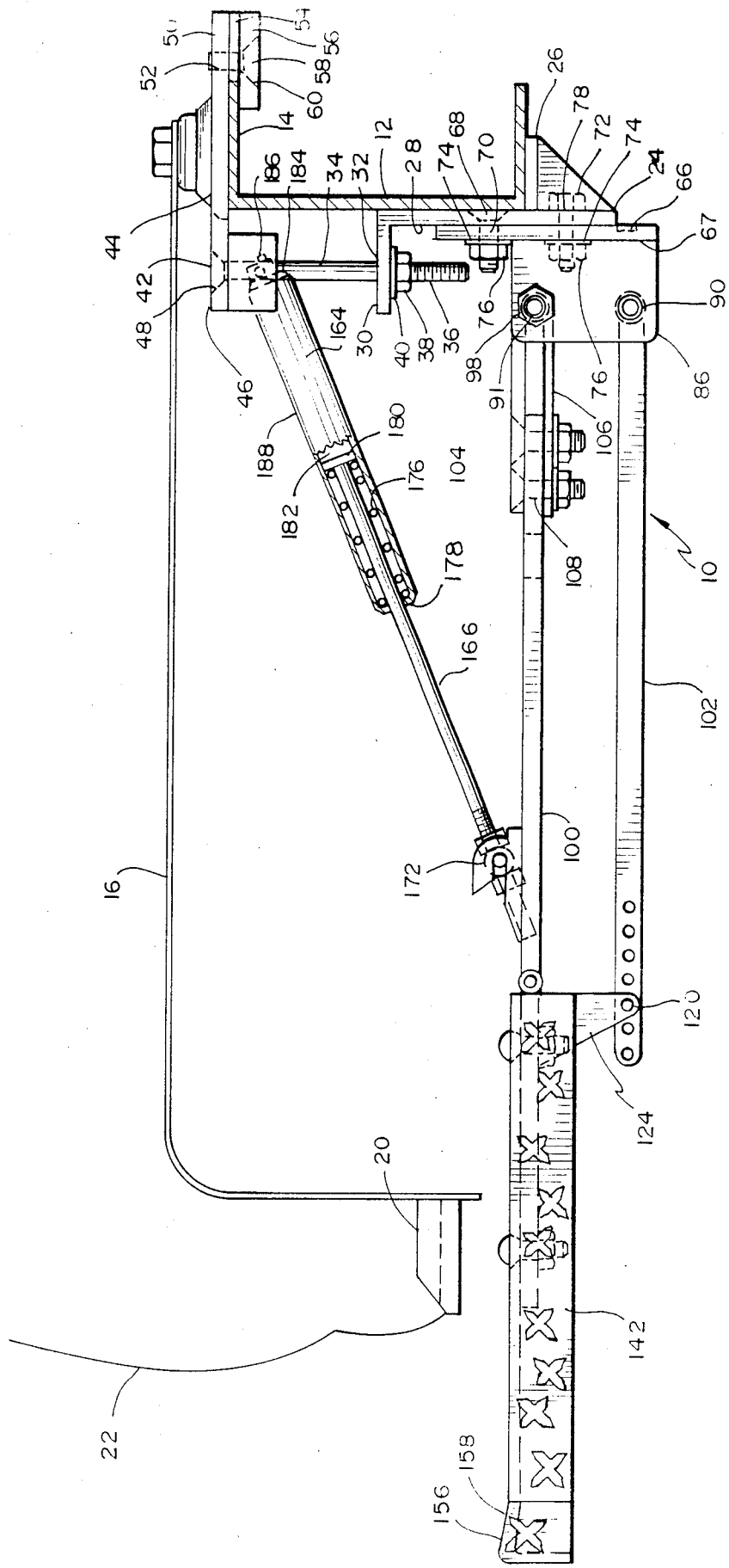
FIG. 3 illustrates an elevational side view, in partial cutaway, of the step assembly shown in FIG. 2.

Referring now to FIGS. 1-4, the adjustable boarding step of the present invention is illustrated generally by reference character 10. As best shown in FIG. 3, the boarding step is adapted to be clamped to a supporting structure 12 of a typical vehicle frame and is also in physical relationship to a typical body floor 16 spaced at one end from supporting structure 12 by body mount 18. The other end of the body floor supports a vehicle step 20 disposed behind vehicle door 22. Supporting structure 12 may be "C-style" frame, as shown. For convenience, the adjustable boarding step 10 will be described and illustrated, mounted to a "C-style" frame, it being readily understood that with minor modification, the mounting elements can be adapted for use with other style frames.

The first clamp member 24 may be L-shaped as shown or may have another shape, such that said first clamp member will fit snugly onto and around a bottom portion of supporting structure 12. To this end, member 24 includes a plate portion 26 having a flat surface which substantially bears the clamp pressure against the bottom inwardly extending surface of supporting structure 12. Plate 26 connects with a vertical plate 28 that in turn has an outwardly extending flange portion 30. Flange portion 30 includes a first and a second bore hole 32 for receiving clamp bolts 34. Clamp bolts 34 are threaded as at 36 on one end along their shafts for receiving clamp nuts 38 and clamp locking washers 40. The other end of bolt 34 includes a head 42 which is retained in slots 48 in a second clamp member 44.

The first clamp member 24 and the second clamp member 44 together with threaded clamp bolts 34, clamp nuts 38, clamp locking washers 40, clamp spacer 54, clamp retainer 56, and clamp retainer screw 58 form an adjustable clamp assembly. To this end, the second clamp member 44 extends over the top portion 14 of supporting structure 12 in a space between the body floor 16, mount 18 and supporting structure 12, and includes a protruding extension portion 46 at one end and a fastening arm portion 50 at the other end. Arm 50 is attachable to clamp retainer member 56 and a clamp spacer 54. The clamp spacer 54 may be a replaceable washer as shown or alternatively can be fabricated to be integral with either the fastening arm portion 50 or the clamp retainer 56. The thickness and diameter of clamp spacer 54 can be varied to conform with the dimensions of the supporting member 12. Fastening arm portion 50 has a threaded bore to allow a connecting screw 58 passed through a complementary countersunk bore 60 in clamp retainer 56 and a complementary passed hole in a clamp spacer 54 to mount the clamp retainer 56 to fastening arm portion 50. The connecting screw 58 sandwiches the top portion 14 of the supporting structure 12 between fastening arm portion 50 and clamp retainer 56 thus holding second clamp member plate 44 firmly to the top portion 14 of supporting structure 12. For devices which may be customized to a particular vehicle or supporting structure, fastening arm portion 50, clamp spacer 54 and clamp retainer 56 may be manufactured to be an integral piece with second clamp member plate 44 which fits over and can wedge against the top portion 14 of supporting structure 12 in a machined slot between fastening arm portion 50 and clamp retainer 56. This alternative device would be of a sufficient maximum thickness dimension to allow it to pass easily through the space between the vehicle body floor 16 and supporting structure 12 created by body mount 18.

The protruding extension portion 46 of the second clamp member plate 44 is cantilevered to extend over the edge of supporting structure 1 when the clamp is in place. Protruding extension portion 46 includes two parallel countersunk slots 48 for receiving the clamp bolt heads 42 when the clamp bolts 34 are engaged through bores 32 in the first clamp member 24 with clamp lockwashers 40 and clamp nuts 38. When clamp nuts 38 are engaged and tightened, first and second clamp members 24, 44 are forced to clamp together and to tightly grip supporting structure 12. Slotted bores 48 allow for adjustability in engaging portions of second clamp member 44 to compensate for the length of top portion 14 of supporting structure 12. The clamp locking washers 40 between clamp nut 38 and the first clamp member outwardly extending flange 30 retains clamp nut 38 in the engaged position in spite of vehicle vibration which is caused by motion of the vehicle to which the adjustable boarding step 10 is clamped. Clamp bolt head 42 is chamfered so as to provide for a flush top surface of second clamp member 44, which may be necessary for placement of the device between the supporting structure 12 and the vehicle body floor 16.

Second clamp member plate 44 also has at least on tab 62 either integral with or connected to its protruding extension portion 46. Tab(s) 62 have tab bore(s) 64 for providing connection to a shock absorber or strut, generally indicated at 164 and hereinafter described in detail.

First clamp member 24 is connected to or integral with a third clamp member 66. Third clamp member 66 is shown in the preferred embodiment as an adjustable separate element in FIGS. 1-4, but it is to be understood that clamp member 66, may be formed integral with the first clamp member vertical portion 28. Attachment between the third clamp member plate 67 and the first clamp member 24 vertical portion 28 is effected through attachment means, such as chamfered conical headed pivot screw 68 disposed in countersunk slot 70 as vertical portion 28 and/or hexagonal headed bolt 72 and locking washers 74 and nuts 76 disposed through slotted hole 78. The third clamp member plate 67 has a pivot screw hole 80 and a slotted vertical adjustment hole 82. The bracket movement indicator 84 (for clarification only, not a physical part of clamp) shows that the third clamp member 66 is adjustable in relation to first clamp member 24. The chamfered slotted hole 70 is the first clamp member 24 is complementary to hole 80 in the third clamp member plate 67 and the first clamp member 24 slotted hole 78 is complementary to the vertically slotted hole 82 in the third member pivot plate 67. These complementary holes in conjunction with screw(s) 68 and/or hexagonal headed bolt(s) 72 and locking washers 74 and nuts 76 form an adjustment relationship as shown in the bracket movement indicator 84. This relationship allows for moving the third clamp member 66 in relation to the first clamp member 24 either left or right and/or up or down creating an angular as well as a height adjustment in order to ensure the adjustable boarding step will clear the vehicle body door 22 and vehicle step 20 while remaining substantially parallel to the body floor 16 and the ground regardless of the shape of supporting member 12. Locking washers 74 prevent nuts 76 from loosening due to vehicle vibrations.

Third clamp member 66 includes a pair of ears or which have transverse bores 88 for receiving pivot shoulder bolt shafts 90 and 91. Pivot shoulder bolt shafts 90 and 91 form a part of bolts 92 and 93 having pivot bolt heads 94 and threaded ends 96 for receiving and threadably engaging pivot nuts 98.

Pivot shoulder bolt shafts 90 and 91 are disposed in transverse bores 88 and are adapted to retain top supporting member 100 and bottom supporting member 102 between extension arms 86 in a rotatable connection. Top supporting member 100 is shown slidably connected between two plate members 104, 106. The slidable connection is optional and provides a means for lengthening or shortening the effective length of top supporting member 100. This slidable connected is effected by slotted hole(s) 108 in top supporting member 100 which is best shown in FIG. 2. Top and bottom plate members 104, 106, respectfully, are bored for receiving plate bolts 110, which operate to grip one end of top supporting member 100 between them. Slotted hole 108 in supporting member 100 provides a through means for inserting plate bolts 110, and loosening of the nuts 114 by unscrewing them allows for longitudinal adjustment of top supporting member 100 relative to slide plate members 104, 106 in the directions of the double headed arrow shown in FIG. 1. Locking washers 112 are positioned between nuts 114 and slide plate member 106 to retain the nuts 114 on the plate bolts 110.

Slide plates 104, 106 are in turn connected to a cylindrical pivot tube 118 through which bolt 92 is disposed so as to retain the slide plate members 104, 106 in a pivotally rotatable relationship relative to pivot should bolt shaft 90 of the pivot bolt 92. Disengagement and withdrawal separation of pivot bolt 92 from pivot tube 118 will allow slidable removal of the slide plate members 104, 106 together with the pivot tube 118 from its mounted position or the third clamp member extension arms 86. When in the mounted position the pivot bolt 92 is retained in position by pivot nut 98.

Bottom supporting member(s) 102 provide a mounting structure which also allows for adjusting its effective length in the longitudinal dimension. Lower pivot bolt 120 is shown in FIG. 3 inserted through one of a number of transverse bores 122, spaced apart from each other at the opposite end of support member 102 as that of the pivot connection to the third clamp number 66 extension arm 86. Lower pivot bolt 120 retains in place a step gusset or step support assembly buttress member 124 and connects the buttress member 124 to support member 102. Lower pivot bolt 120 is slidably removable from the transverse bore 122 and from a bore 126 at the end of gusset 124. The lower pivot bolt is held in place by locking washer 128 and nut 130. To change the effective length of support member 102, or the length between the pivot axle of pivot bolt 93 and lower pivot bolt 120, the hole 126 is simply positioned over the desired transverse bore 122 and lower pivot bolt 120 is again inserted through both hole 126 and the transverse bore 122 which is desired and thus provides a desired pivot axle. This mechanism makes the effective length of the support member 102 adjustable in the longitudinal direction. Means to retain lower pivot bolt 120 in position are then effected. Such means may be a bolt and nut mechanism as shown or a pivot shaft head and a cotter pin (not shown).

It is to be understood that the details of FIGS. 1-4 are simply illustrative, and that both supporting members 100, 102 may have identical means to change their effective length. Although the configuration shown in FIGS. 1-4 is the preferred embodiment, other configurations may be used, such as two sets of slide plate members 104, 106 at the tab portion 6 end of the supporting members 100,102, or slide plate members 104, 106 at the tab portion 6 end of member 100 and another set of plate members at the step assembly gusset 124 end of supporting member 102. Alternative, adjustable connecting schemes not shown in any of the drawings may be used, such as clamps or screw adjustments.

Support member 100 is attached to step assembly gusset 124 at a pivot point by means of upper pivot bolt 132 which fits through and is inserted into one or more support member sockets 134 and buttress tubular member portion 136. As is shown most clearly in FIG. 1, two support member sockets 134 are disposed on either side of the buttress tubular or socket member portion 136 and assembly of the buttress member 124 with support member 100 requires the lining up of the cavities of sockets 134 and tubular portion 136 by any known means, such as with a bolt and nut configuration or, as is shown in FIG. 2, by a round head 138 at one end of pivot bolt 132 and a cotter pin 140 inserted into a transverse pin bore in pivot bolt 132 at the other end.

The step assembly includes a step 142 which is connected to gusset 124. Step 142 may be integral with gusset 124 or, as is shown in FIGS. 104, it may be a separate member which is in an adjustable relationship in the longitudinal direction as indicated by the double headed arrow in FIG. 1. Gusset member 124 has a support plate 144 adjacent to step 142 and on which step 142 rests. Step 142 is shown with countersunk step holes 146 for receiving step retaining bolts 148. Support plate 144 has slots 150 which after assembly are disposed immediately below step holes 146 so that bolts 148 can be inserted through both holes and slots and retained by locking washers 152 and nuts 154 screwed onto the threaded ends of bolts 148.

To adjust the position of step 142 relative to the support plate portion 144 of the buttress member 124, loosening of nuts 154 allows for slidably repositioning step 14 in the desired direction until a desired position is achieved. Tightening nuts 154 on step retaining bolts 148 connects the step 142 to the plate 144 in the desired position.

The pivot axes formed by pivot bolt shafts 90, 91 and pivot bolts 120, 132 when viewed from the side in FIG. 3 are positioned in the shape of a trapezoid with lower pivot bolt 120 being slightly offset with respect to upper pivot bolt 132. The complete system including the pivot axes allows for vertical motion of the step 142, and the parallel structure of supporting members 100, 102 restrain each pair of pivot bolt shafts 90, 91 and pivot bolts 120, 132 to maintain an almost identical vertical orientation to each other as well as relative to a fixed position, such as the ground.

Figure 4:
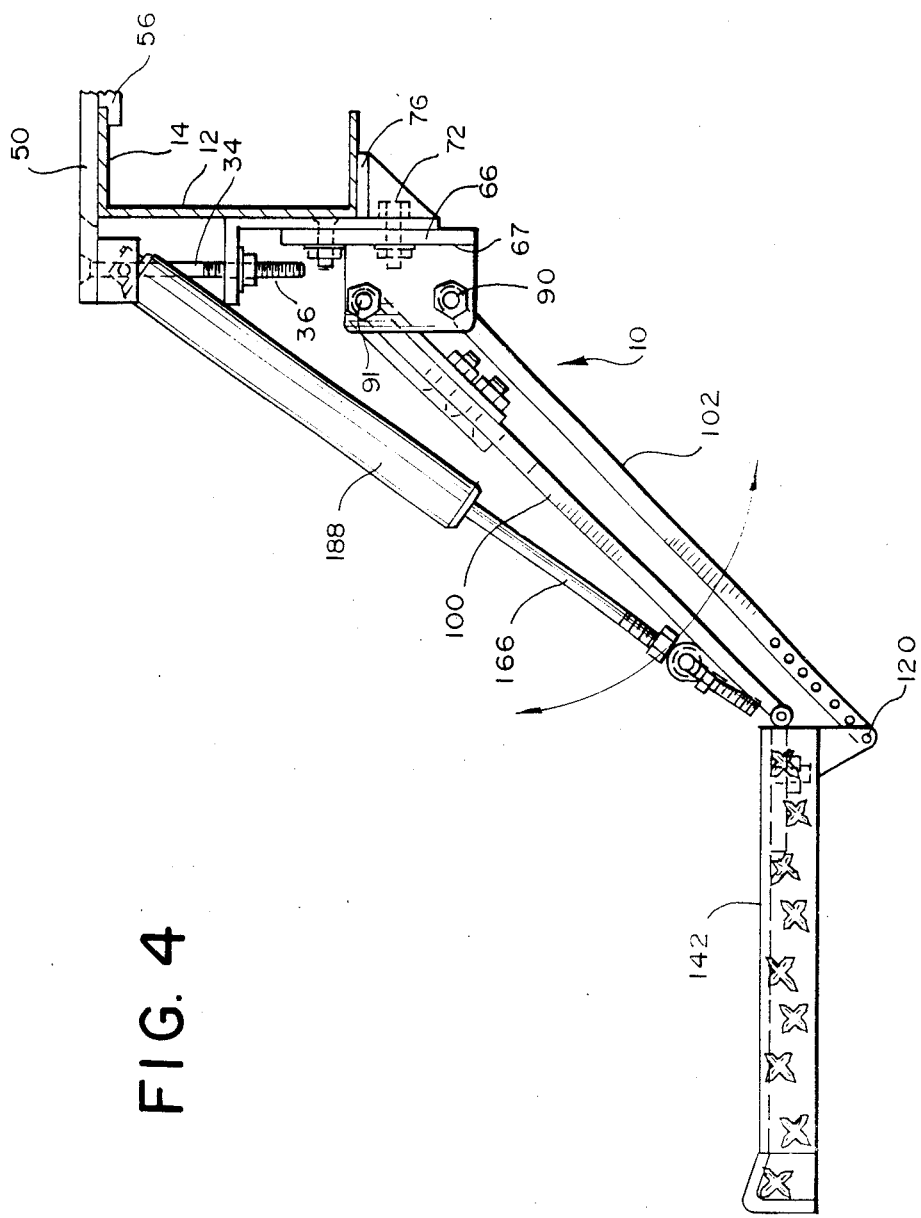
FIG. 4 illustrates an elevational side view of the step assembly to the present invention in its extended position.

For instance, FIG. 4 illustrates the step 142 having been lowered to a lower position by a rotation of the support members 100, 102 relative to tap portion 86 and the step assembly 124, 142 and 144. Pivot bolt shafts 90, 91 of course, do not move relative to each other as they are fixed by tab portion 86, which does not move during operation of the step. However, because of the restraint imposed by the support members 100, 102, pivot bolts 120, 132 remain the same position with respect to each other as when the step 142 is in the rest position, with the support members and pivot axles forming a shape similar to an elongated parallelogram in side view. This relationship causes step 142 to remain substantially parallel to its original orientation in the retracted position of FIG. 3 as it is lowered to the extended position in FIG. 4. Careful examination of FIG. 4 will reveal, however, that due to the offset of pivot bolts 120 relative to pivot bolt 132, the pivot axis formed by bolt 120 causes the support member 100, 102 ends closest to the buttress member 124 to come closer together than the ends closest to the tab portion 86. This relationship causes the step 142 to tilt very slightly inboard, i.e., toward supporting structure 12, when the step 142 is in the lowered position. This tends to prevent a vehicle operator's foot from slipping off thus providing an extra measure of safety in the device, albeit, an incremental one.

Other design features which add to the safety considerations are also addressed by the invention. The heads of step retaining bolts 148 are conical and fit into the countersunk holes 146 so that a flush surface is provided on step 142. A slightly upturned rim 156, as shown in FIG. 3, may be covered with a non-skid material, such as rubber, to form a tread 158. Raised treads 160 in the shape of a cross or other shape design may be punched into step 142, which may be made of sheet metal, so as to provide a surer footing for the operator. Amenities, such as a boot vee 162 may be provided in step 142 as a means for wedging and retaining an operator's boots which the operator may wish to remove before entering the cab of the vehicle because the boots are muddy and difficult to remove.

Referring once again to FIGS. 3 and 4, it is necessary to retain the step in one of two desired positions depending on whether it is in use or not. When the vehicle is being driven, it is desired to have the step 142 as far as possible from the ground so as to maintain sufficient clearance between the step and ground. FIG. 3 shows the step in the position where it is approximately level with the frame 12 and in the suitable position for driving. To use step 142, an operator merely steps onto it and places the weight of the body on the step. The force of the operator's weight causes the pivot bolts to rotate so that the step 142 moves from the rest position of FIG. 3 to the extended position of FIG. 4.

Shock absorber element 164, also referred to as a strut, is shown in particle cut-away view in FIG. 3. It provides a retention means between support element 100 and tab 62 of second clamp member 44. Shock absorber element 164 can be conventional shock absorber having a partially threaded rod 166 which is attached to supporting member tabs 168 through an adjustable nut assembly 170. The assembly 170 has a pivot shaft 172 which is inserted into a tab bore 172 in tabs 168. The shock absorber element 164 has biasing means in the form of spring 176 which retains the high-clearance vehicle boarding step 10 in the rest position shown in FIG. 3. Force exerted by spring 176 against shock absorber end wall 178 and piston member 180 tends to pull rod 166 into the shock absorber element chamber 182.

Piston member 180 sealingly encloses the chamber 182 which is formed by a second end wall having aperture 186 and side walls 188 of shock absorber element 164. Chamber 182 may contain fluid such as hydraulic fluid or a gas such as air. The preferred embodiment shown in FIGS. 1–4 uses air as the working gas which can escape through an aperture 186 in second end wall 184 and which moderates the speed of the spring action of spring 176. This added safety feature of the present invention decreases the risk of serious injury should the operator slip from the step when it is in the lowered extended position. The working gas in chamber 182 will then escape slowly out of aperture 186 in end wall 184 and detain the retraction of step 142 causing it to raise slowly. Likewise, the intake of air through aperture 186 during extension of the step assembly 10 will cause the step extension speed to be moderated. The size of aperture 186 may be adjustable to provide the desired speed for retraction of step 142 when it is released to return to its rest position. The seal for piston member 180 may be provided by a conventional rubber or plastic gasket and by grease. Alternatively, a shock absorber using hydraulic fluid or other types of fluid or gas as the working fluid may be used.

Connection of the shock absorber element 164 to the other operative members of the device is best effected at positions providing greatest leverage to the shock absorber pivot shaft 172 which is preferably positioned as far from the tab portion pivot bolt shafts 90, 91 as is possible. Accordingly, support member tabs 168 are positioned on support member 100 as close to upper pivot bolt 132 as is practical for the threaded portion of rod 166 to clear the obstruction of pivot shaft 132 when rod 16 is pivoted about support member pivot shaft 172. Rod 166 is shown in phantom protruding into support member 100 in FIG. 3, but reference to FIG. 1 shows that support member 100 provides for a slot 190 through which rod 166 can extend when the support member is moved. Screwing the nuts 192 of the adjustable nut assembly 170 can extend or shorten the effective length of rod 166, but the preferable design of the threads do not allow adjustment of the nut assembly so far along the rod 166 that its protruding threaded end will make contact with upper pivot shaft 132 when the rod 166 is rotated about pivot shaft 172.

The other end of shock absorber element 164 is connected to the clamp structure, with preferable connection being made to tabs 62 of the protruding portion 46 of second clamp member 44. As described above, tab 62 includes a bore 64 for insertion of shock absorber pivot bolt 194 about which the chamber end of shock absorber 164 is pivotable. A shock absorber tab 196 is attached to the shock absorber end wall 184 and is provided with a bore 198 through which the shock absorber pivot bolt 194 can pass. The shock absorber pivot bolt can be retained by any of the means discussed above, such as with a nut or a pivot cap and cotter pin. The exact position of the pivot axle provided by shock absorber pivot bolt 194 is not crucial, but preferably, it is removed as far from the pivot bolt shafts 90, 91 about which support members 100, 102 rotate, as is practicable so as to provide maximum leverage for the shock absorber 164. Accordingly, tab bore 64 is positioned on tab 62 so as to provide rotating clearance for the shock absorber end wall 184 while simultaneously being close to the plane of protruding member 46.

Other embodiments of the inventive high step device as well as combinations of the various features discussed above will become apparent from an understanding of this invention.

Although the present invention has been discussed and described with primary emphasis on the preferred embodiment, it should be understood that various modifications can be made in the design and operation of the present invention without departing from the true spirit thereof. The description is therefore illustrative and not restrictive, and resort should be made to the following claims which define the full scope of the invention.

I claim:

1. An adjustable boarding step for high-clearance vehicles comprising:
   (a) adjustable clamp means for clamping onto a supporting structure of a vehicle;
   (b) a bracket interconnecting said clamp means and at least an upper and a lower support member;
   (c) said support members each having at least a proximate and a distal end;
   (d) means for adjustably connecting said support members to said bracket at said proximate end by a first pivot means, each of said support members being rotatable about said first pivot means;
   (e) a step assembly including a second pivot means for adjustably and pivotally connecting said step assembly to said support member distal end, whereby said first and second pivot means maintain said support members in a generally parallel relationship to each other;
   (f) biasing means for maintaining the step assembly at a predetermined position, said biasing means having at least two ends, one end being pivotally connected to said clamp means and the other end being pivotally and longitudinally adjustably connected to at least one of said support members; and
   (g) means for adjusting effective length of said support members comprising for said upper support member a plate disposed adjacent to said upper support member and slidable connected thereto, with said plate being connected to said first pivot means, a connecting member, fixedly connecting said plate member at predetermined locations to effect a desired length adjustment in said upper support member, and for said lower support member a series of transverse bores adapted to cooperating with said second pivot means.

2. The adjustable boarding step according to claim 1 wherein said bracket comprises a pivot plate and two extension arms connected thereto for supporting said support members at said proximate end.

3. The adjustable boarding step according to claim 2 wherein said pivot plate is slotted to allow for adjustable positioning of said bracket to said clamp means.

4. The adjustable boarding step according to claim 1 wherein said first and second pivot means each comprise pivot shafts providing axes of rotation for each support member end.

5. The adjustable boarding step according to claim 1 wherein said biasing means comprises an adjustable strut connected to said clamp means at one end by a pivot and at the end to support member by a pivot assembly including at least one threaded nut adapted to screw onto said strut end for adjusting the axis of rotation relative to the length of said strut.

6. The adjustable boarding step accordingly to claim 1 wherein said biasing means comprises a spring for retracting the step to a predetermined position.

7. The adjustable boarding step according to claim 6 wherein said biasing means further includes means for absorbing shock and for moderating the biasing force and momentum of said spring when it is being retracted.

8. The adjustable boarding step according to claim 7 wherein said means for absorbing shock comprises a hydraulic shock absorber.

9. The adjustable step according to claim 7 wherein said means for absorbing shock comprises a gas shock absorber.

10. An adjustable boarding step for high-clearance vehicles comprising:
   (a) adjustable clamp means for clamping onto a supporting structure of a vehicle;
   (b) an upper and a lower support member, each having at least a proximate and a distal end and each being adjustably connected to said clamp means at said proximate end by a first pivot means, each of said support members being rotatable about said first pivot means;
   (c) a step assembly including second pivot means for adjustably and pivotally connecting said step assembly to said support members at said distal ends, said second pivot means adapted to maintain said at least two support members in generally parallel relationship to each other; and
   (d) biasing means for maintaining the step assembly at a predetermined position, said biasing means having at least two ends, one end being connected to said clamp means and the other end being adjustably connected to at least one of said at least two support members of said step assembly; and
   (e) means for adjusting the effective length of said support members comprising for said upper support member a plate disposed adjacent to said upper support member and slidably connected thereto, means for connecting said plate to said pivot means, whereby said upper support member is slidable relative to said plate member and said plate member and said support means are adapted to be fixedly connected at desired locations to effect a desired length adjustment in said upper support member.

11. The adjustable boarding step according to claim 10 wherein said first and second pivot means each comprise pivot shafts providing axes of rotation for each support member end.

12. The adjustable boarding step according to claim 11 wherein said lower support member further comprises means for adjusting the effective length of said lower support member.

13. The adjustable boarding step according to claim 12 wherein said means for adjusting the effective length of said lower support member comprises a series of spaced transverse bores along the length of said lower support member for receiving said pivot shaft, whereby transposing said pivot shaft from one of said bores to another displaces the axis of rotation about which said lower support member rotates.

14. The adjustable boarding step according to claim 12 wherein said biasing means comprises an adjustable strut connected to said clamp means at one end by a pivot and at the other end to said support member by a pivot assembly adapted to screw onto said strut end for adjusting the axis of rotation relative to the length of said strut.

15. The adjustable boarding step according to claim 10 wherein said clamp means further comprises at least two plates forming at least one L-shaped configuration for abutting the supporting structure of a vehicle and for non-permanent, detachable clamping connection to the supporting structure of a vehicle.

16. The adjustable boarding step according to claim 10 wherein said step assembly further includes a step having a boot vee slot for providing leverage in the removal of an operator's boot.

17. The adjustable boarding step according to claim 10 wherein said biasing means comprises a spring for retracting the step to a predetermined position and said biasing means further includes means for absorbing shock and for moderating the biasing force and momentum of said spring when it is being retracted.

18. An adjustable boarding step for high-clearance vehicles comprising:
   (a) adjustable clamp means for clamping onto a supporting structure of a vehicle;
   (b) a bracket interconnecting said clamp means and at least two support members;
   (c) said support members comprising an upper member and at least one lower member, each having at least a proximate and a distal end and means for adjusting the effective length of each of said support members;
   (d) means for adjustably connecting said support members to said bracket at said proximate end by a first pivot means, each of said support members being rotatable about said first pivot means;
   (e) a step assembly including a second pivot means for adjustably and pivotally connecting said step assembly to said support member distal end, said first and second pivot means each comprise pivot shafts providing axes of rotation for each support member end, whereby said first and second pivot means maintain said support members in a generally parallel relationship to each other;
   (f) biasing means for maintaining the step assembly at a predetermined position, said biasing means having at least two ends, one end being pivotally connected to said clamp means and the other end being pivotally and longitudinally adjustably connected to at least one of said support members, and said means for adjusting the effective length of said upper support member comprises a plate member having at least one plate disposed adjacent to said upper support member and slidably connected thereto, with at least one plate being connected to said first pivot means, said plate member and said lower support member each having a complementary slotted through-hole for receiving a connecting member, whereby said connecting member can fixedly connect said plate member at desired locations effecting a desired length adjustment in said upper support member.

19. The adjustable boarding step according to claim 18 wherein said biasing means comprises an adjustable strut connected to said clamp means at one end by a pivot and at the end to support member by a pivot assembly including at least one threaded nut adapted to screw onto said strut end for adjusting the axis of rotation relative to the length of said strut.

20. The adjustable boarding step according to claim 18 wherein said biasing means comprises a spring for retracting the step to a predetermined position.

21. An adjustable boarding step for high-clearance vehicles comprising:
    (a) adjustable clamp means for clamping onto a supporting structure of a vehicle;
    (b) at least two support members, each having at least a proximate and a distal end and each being adjustably connected to said clamp means at said proximate end by a first pivot means, each of said support members being rotatable about said first pivot means, means for adjusting the effective length of at least one of said support members;
    (c) a step assembly including second pivot means for adjustably and pivotally connecting said step assembly to said support members at said distal ends, said first and second pivot means having shafts providing axes of rotation for each support member end, and said second pivot means adapted to maintain said at least two support members in generally parallel relationship to each other;
    (d) biasing means for maintaining the step assembly at a predetermined position, said biasing means having at least two ends, one end being connected to said clamp means and the other end being adjustably connected to at least one of said at least two support members of said step assembly, and said means for adjusting the effective length of at least one of said support members comprise a plate member having at least one plate disposed adjacent said at least one of said support members and slidably connected thereto, said at least one plate being connected to said pivot means, said support means and said plate member each having a complementary slotted through-hole for receiving a connecting member, whereby said at least one support member is slidable relative to said plate member and said connecting member can fixedly connect said plate member and said support means at desired locations effecting a desired length adjustment in at least one support member.

22. The adjustable boarding step according to claim 21 wherein said biasing means comprises an adjustable strut connected to said clamp means at one end by a pivot and at the other end to said support member by a pivot assembly adapted to screw onto said strut end for adjusting the axis to rotation relative to the length of said strut.

23. The adjustable boarding step according to claim 21 wherein said clamp means further comprises at least two plates forming at least one L-shaped configuration for abutting the supporting structure of a vehicle and for non-permanent, detachable clamping connection to the supporting structure of a vehicle.

24. The adjustable boarding step according to claim 21 wherein said step assembly further includes a step having a boot vee slot for providing leverage in the removal of an operator's boot.

25. The adjustable boarding step according to claim 21 wherein said biasing means comprises a spring for retracting the step to a predetermined position and said biasing means further includes means for absorbing shock and for moderating the biasing force and momentum of said spring when it is being retracted.

26. The adjustable boarding step according to claim 21 wherein said means for adjusting the effective length of said support members comprises a series of spaced transverse bores along the length of said lower support member for receiving said pivot shaft, whereby transposing said pivot shaft from one of said bores to another displaces the axis of rotation about which said lower support member rotates.

* * * * *